3,381,009
TRIAZOLE-[4,3-a]-PYRIDINES
Giuseppe Palazzo and Bruno Silvestrini, Rome, Italy, assignors to Aziende Chimiche Riunite Angelini Francesco a Roma, an Italian corporation
No Drawing. Filed Oct. 28, 1966, Ser. No. 590,226
Claims priority, application Italy, Dec. 15, 1965, 12,993/65; Aug. 3, 1966, 21,074/66
8 Claims. (Cl. 260—268)

ABSTRACT OF THE DISCLOSURE s-Triazolo-[4,3-a]-pyridine derivatives of certain heterocyclic nitrogen compounds, and non-toxic salts thereof with organic and inorganic acids, have been found to have pharmacological and therapeutical activities, particularly tranquillizing, hypotensive and analygesic action. Methods for preparing the derivatives and their salts are provided.

This invention relates to a series of s-triazolo-[4,3-a]-pyridine derivatives of the following general Formula I:

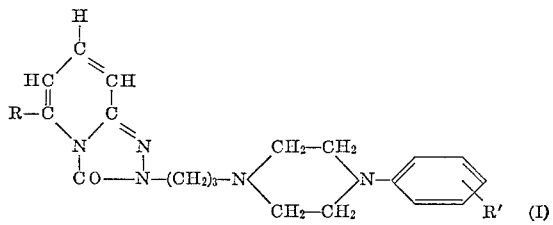

wherein:

R is H, —CH₃
R' is H, lower alkyl with 1 to 4 carbon atoms, alkoxy with 1 to 4 carbon atoms, halogen and their non-toxic salts with organic or inorganic acids.

This invention, moreover, relates to the processes for the preparation of the compounds of general Formula I.

It has been found that s-triazole-[4,3-a]-pyridine derivatives of general Formula I show some interesting pharmacological and therapeutical activities, and particularly tranquilizing action, hypotensive action and an analgesic action. The therapeutical effects of the compounds of general Formula I result from the following considerations.

(a) Tranquillizing action.—The s-triazolo-[4,3-a]-pyridine derivatives, in fact, induce sedation, reduce reactivity, decrease motor activity, hypotonia and, at high doses, induce muscular non-coordination and ataxy. These effects have been evidenced in mice, rats, cats and dogs by applying the Irwin method (1964). The lowest active doses are generally in the range between 1 and 5 mg./kg., subcutaneously or by mouth. Moreover, doses of 10 mg./kg. subcutaneously, 2-[N'-(m.chlorophenyl)-piperazino]-propyl-s.triazolo[4,3-a]-pyridine-3-one inhibit in rats the conditioned reflexes studied according to the Cook and Weidley technique (1957). These effects on the behaviour are accompanied by characteristic neurovegetative effects, consisting chiefly of a mild adrenolytic action (at the dose of 0.5 mg./kg. intravenously the pressure response to adrenaline is inhibited in rats as well as in cats) and of a marked anti-serotonine action. This latter property has been evaluated by studying the antagonism to foot oedema from serotonine in rats (minimum active dose 0.6 mg./kg., subcutaneously) to bronchospasm from serotonine in rats (lowest active dose 0.025 mg./kg. intravenously) according to the Konzett and Rossler method (1940) and the antagonism to the pressure response from serotonine in decapitated rats (lowest active dose, 0.05 mg./kg. intravenously).

In conclusion, the data relative to the effects on behaviour, suggest a tranquillizing action. In fact, the products exert a marked sedative, tranquillizing and myorelaxing action, and the "dose/effects" curves show the characteristic flat shape of known tranquillizers. Moreover, the deconditioning action of rats and the presence of adrenolytic and anti-serotonine effects indicate a greater resemblance to major tranquillizers, such as chloropromazine, than to the minor ones such as meprobamate and diazepoxide.

(b) Hypotensive action.—This has been evidenced both in normal rats (doses between 5 and 10 mg./kg., subcutaneously) as well as in narcotized cats (at the dose of 0.250 mg./kg. intravenously) and in rats with experimental hypertension according to Grollman (1954), at the dose of 5 mg./kg. by mouth.

(c) Analgesic action.—2 - [N' - (m.chlorophenyl)-piperazine]propyl - s.triazolo - [4,3 - a] - pyridine - 3-one in fact, inhibits writhing from phenylquinone (Siegmund et al., 1957) at the dose of 1 mg./kg. subcutaneously and is equally active in the tail pinching test (Bianchi and Franceschini, 1954) at the dose of 3 mg./kg. subcutaneously.

Since these substances proved to be scarcely toxic both in the acute and in the chronic tests, their therapeutical interest for humans appears evident.

The compounds according to the invention, can be prepared by following one of the general procedures listed below:

(1) Action of a s - triazolo - [4,3 - a] - pyridine - 3-one (II) on a suitable N - aryl - N' - (ω - halo - alkyl)-piperazine (III).

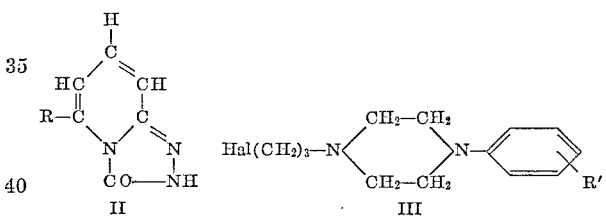

For this reaction, it is convenient to prepare first, the sodium salt of s - triazolo - [4,3 - a] - pyridine - 3 - one with alcoholate, sodium amide or sodium hydride and to heat then in a suitable solvent (dioxane, benzene, toluene, xylene, alcohol, tetraline, dimethylsulfoxide, dimethylformamide) for periods of time from 2 to 36 hours. Use may also be made of a hydrohalogenic acid acceptor such as pyridine or triethylamine.

(2) Action of a suitable N - aryl - piperazine on a 2 - (ω - haloalkyl) - s.triazolo - [4,3 - a]pyridine - 3 - one (IV).

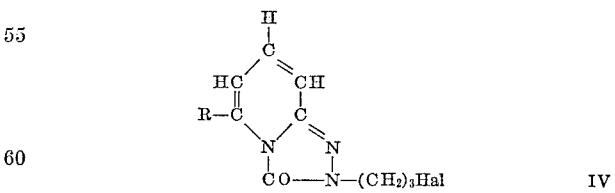

This reaction is effected preferably in an inert solvent (benzene, toluene, tetraline) in the presence of a hydrohalogenic acid acceptor, as for example, triethylamine, by heating to the boiling point for periods of time from 2 to 36 hours. However, one can operate with an arylpiperazine excess or also in a heterogenic phase, that, is to say in the presence of an aqueous NaOH solution.

(3) Action of a suitably substituted aniline on a 2-(γ - morpholino - alkyl) - s.triazolo[4,3 - a] pyridine-3 - one

3

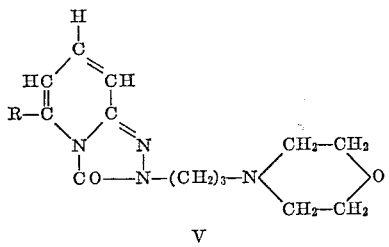

V

The reaction is carried out preferably by heating the dry hydrochlorides of the two substances at temperatures between 200 and 250° C. for periods of time from 2 to 12 hours.

(4) Action of a suitable dichloroethylaniline (VI) on a 2-(ω-amino-alkyl)-s.triazolo-[4,3-a]-pyridine-3-one (Formula VII):

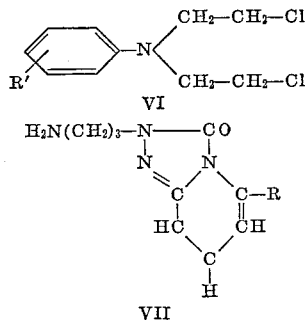

The reaction conditions are similar to those indicated for the preceding method.

The substances prepared according to one or more of the indicated methods, have been transformed to salts for the pharmocological tests. Among the various types of salts considered, there are those with inorganic acids, such as the hydrochloride, sulfate, phosphate, and so on, those with mono- and multi-carboxylic aliphatic acids, such as formic, acetic, lactic, succinic, malonic, glutaric, adipic, tartaric, citric, maleic, fumaric acid, and so on, those with aromatic acids, such as benzoic, salicylic, pamoic acid, and so on, those with mandelic, diphenylacetic, benzyl acid, and so on, those with sulfonic acids, such as p-toluenesulfonic, methanesulfonic acid, and so on, those with sulfamic acids, such as cyclamic acid and so on.

The following example illustrates the processes according to the invention, without having, however, any limiting nature.

Example 1.—2-[N'-(m-chlorophenyl)-piperazine]propyl-s.triazolo-[4,3-a]-pyridine-3-one To a boiling solution of 6.7 g. s-triazolo-[4,3-a]-pyridine-3-one in 80 ml. dioxane, there is added 2.4 g. 50% NaH. The mixture is refluxed during 1 hour under stirring, then 13.5 g. 1-(3-chloropropyl)-4-m-chlorophenyl-piperazine is added. The mixture is refluxed under stirring for 20 hours, cooled, diluted with an equal volume of ether, the sodium chloride filtered out, and ethereal HCl added. The solid which precipitates is filtered out and crystallized from 95% alcohol. Yield: 13.5 g., M.P. 223° C.

The base shows an M.P. of 86–87° C. Sulfate: M.P. 133–6° C., Maleate: M.P. 172° C. Succinate: M.P. 146–9° C., Benzylate: M.P. 136–9° C. p-Toluenesulfonate: M.P. 188° C.

Example 2.—2-[N'-(phenyl)piperazine]propyl-s.triazolo-[4,3-a]pyridine-3-one 27 g. s.triazole[4,3-a]pyridine-3-one are dissolved in 300 ml. boiling dioxane and treated with 9.6 g. sodium hydride in 50% oily suspension. After half an hour, there is added 21.5 g. 1-bromo-3-chloropropane and the resulting mixture is maintained under stirring and under reflux for 8 hours. The inorganic salts are filtered off and the dioxane is removed at a reduced pressure. The mixture is alkalized and the basic portion is extracted. The 2-(γ-chloropropyl)-s.triazolo [4,3-a] pyridine-3-one thus prepared crystallizes from hexane and shows an M.P. of 73–75° C.

2.1 g. of this substance, 1.8 g. N-phenyl-piperazine 1 g. triethylamine and 25 ml. toluol are refluxed for 3 hours. Then, the mixture is cooled, washed with water and the toluene solution is treated with ethereal hydrochloric acid. Thus 2-N'-phenylpiperazinepropyl-s.triazolo [4,3-a] pyridine-3-one hydrochloride precipitates; it crystallizes from absolute alcohol and shows an M.P. of 218°.

Example 3.—2[N'-(o-methoxyphenyl)piperazine] propyl-s.triazolo[4,3-a]pyridine-3-one Equimolar amounts of s-triazole [4,3-a]pyridine-3-one, sodium-amide and N-(γ-chloropropyl)-morpholine are heated under stirring and reflux for 8 hours. Then the mixture is cooled, filtered, the solvent is removed at a reduced pressure and the residue is alkalized with an NaOH solution. It is extracted with ether and from this solution 2-(γ-morpholinopropyl)-s.triazolo[4,3 - a]pyridine-3-one hydrochloride is precipitated with ethereal hydrochloric acid. It shows an M.P. of 235° (decomposition).

An equimolar mixture of this substance and of o-methoxyaniline hydrochloride (both well dry) is warmed for 4 hours at 220°. It is added with NaOH and ether and from the ethereal solution of 2-N'-o-methoxyphenyl-piperazinopropyl-s.triazol [4,3-a]pyridine - 3 - one is precipitated in the form of its hydrochloride by means of ethereal hydrochloric acid. The product, as crystallized from absolute alcohol, shows a melting point of 203–4°.

Example 4.—2-[N'-(m.chlorophenyl)-piperazino]propyl-s.triazolo[4,3-a]pyridine-3-one 1 g. 2-(γ-chloropropyl)-s.triazolo-[4,3-a]-pyridine-3-one and 5 ml. saturated ammonia alcoholic solution are heated for 5 hours in a closed tube at 100°. The contents of the tube are cooled, the ammonium chloride filtered out and the solvent is removed. There remains a residue of 0.9 g. 2-(γ-aminopropyl)-s.triazolo-[4,3-a]-pyridine-3-one.

This residue is dissolved in isopropyl alcohol and 1 g. N-bis-chloroethyl-aniline is added to it. The mixture is refluxed for 3 hours. The solvent is removed at a reduced pressure, the residue is treated with 50% potassium carbonate, and extracted with ether. By treating with etheral hydrochloric acid, 2-N'-m.chlorophenylpiperazino-propyl-s.triazole-[4,3-a]-pyridine-3-one hydrochloride is precipitated; M.P. 223°.

By employing one or more of the indicated methods, also the following substances are prepared:

(1) 2-[N'-(p-tolyl) - piperazino] - propyl-s.triazolo-[4,3-a]-pyridine-3-one hydrochloride hemihydrate M.P. 235°.

(2) 5 - methyl - 2 - [N'-(m-chlorophenyl)piperazino] propyl-s.triazolo-[4,3-a]-pyridine - 3 - one hydrochloride M.P. 221°.

(3) 5-methyl - 2 - [N'-(o-methoxyphenyl)-piperazino] propyl-s.triazolo-[4,3-a]-pyridine - 3 - one hydrochloride M.P. 234°.

We claim:
1. A member selected from the group consisting of a derivative of s-triazolo-[4,3-a]-pyridine of Formula I

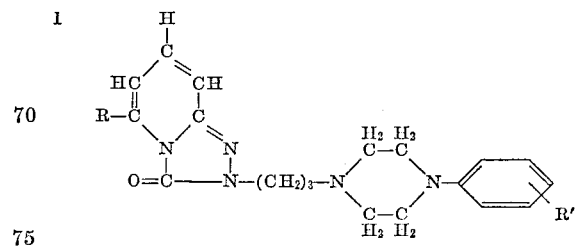

wherein R is hydrogen or methyl, and R' is a member selected from the group consisting of hydrogen, lower alkyl having 1 to 4 carbon atoms, lower alkoxy having 1 to 4 carbon atoms and halogen, and a non-toxic salt thereof with an organic or inorganic acid.

2. Compound according to claim 1 which is 2-[N'-m.chlorophenyl) - piperazino] - propyl-s.triazolo-[4,3-a] pyridine-3-one.

3. Compound according to claim 1 which is 2-[N'-(phenyl)-piperazino]-propyl-s.triazolo - [4,3-a]-pyridine-3-one.

4. Compound according to claim 1 which is 2-[N'-(p.tolyl) - piperazino] - propyl-s.triazolo-[4,3-a]-pyridine 3-one.

5. Compound according to claim 1 which is 2-[N'-(o.methoxyphenyl) - piperazino]-propyl-s.triazolo-[4,3-a] pyridine-3-one.

6. Compound according to claim 1 which is 2-[N'-(m.chlorophenyl)-piperazino] - propyl - s.triazolo-[4,3-a] pyridine-3-one.

7. Compound according to claim 1 which is 5-methyl-2-[N' - (m.chlorophenyl) - piperazino]-propyl-s.triazolo-[4,3-a]-pyridine-3-one.

8. Compound according to claim 1 which is 5-methyl-2-[N'-(o.methoxyphenyl) - piperazino]-propyl-s.triazolo-[4,3-a]-pyridine-3-one.

References Cited

UNITED STATES PATENTS 3,290,327  12/1966  Palazzo _____ 260—308

OTHER REFERENCES

Hauptmann et al.: Auslegeschrift, 1,457,591 4/1963.

HENRY R. JILES, *Primary Examiner.*